United States Patent [19]

Wickersheim et al.

[11] Patent Number: 5,183,338
[45] Date of Patent: Feb. 2, 1993

[54] TEMPERATURE MEASUREMENT WITH COMBINED PHOTO-LUMINESCENT AND BLACK BODY SENSING TECHNIQUES

[75] Inventors: Kenneth A. Wickersheim, Menlo Park, Calif.; Bruce E. Adams, Portland, Oreg.

[73] Assignee: Luxtron Corporation, Campbell, Calif.

[21] Appl. No.: 808,012

[22] Filed: Dec. 13, 1991

Related U.S. Application Data

[62] Division of Ser. No. 683,258, Apr. 10, 1991, Pat. No. 5,112,137.

[51] Int. Cl.⁵ ............................ G01K 11/20; G01J 5/08
[52] U.S. Cl. ............................................... 374/131; 374/161
[58] Field of Search ............... 374/161, 131, 159, 130, 374/121; 356/44; 250/338.1

[56] References Cited

U.S. PATENT DOCUMENTS

| | | | |
|---|---|---|---|
| Re. 31,832 | 2/1985 | Samulski | 374/131 |
| 4,016,761 | 4/1977 | Rozzell et al. | 374/161 |
| 4,136,566 | 1/1979 | Christensen | 374/161 |
| 4,140,393 | 2/1979 | Cetas | 374/161 |
| 4,376,890 | 3/1983 | Engström et al. | 374/131 |
| 4,448,547 | 5/1984 | Wickersheim | 374/131 |
| 4,576,486 | 3/1986 | Dils | 374/131 |
| 4,652,143 | 3/1987 | Wickersheim et al. | 374/131 |
| 4,750,139 | 6/1988 | Dils | 374/133 |
| 4,794,619 | 12/1988 | Tregay | 374/131 |
| 4,845,647 | 7/1989 | Dils et al. | 374/131 |
| 4,859,079 | 8/1989 | Wickersheim et al. | 374/131 |
| 4,880,972 | 11/1989 | Brogarth et al. | 374/161 |
| 4,895,156 | 1/1990 | Schulze | 374/161 |
| 4,986,671 | 1/1991 | Sun et al. | 374/131 |

FOREIGN PATENT DOCUMENTS

| | | |
|---|---|---|
| 2113837B | 4/1986 | United Kingdom . |
| 2194633 | 3/1988 | United Kingdom ............... 374/161 |

Primary Examiner—William A. Cuchlinski, Jr.
Assistant Examiner—Diego F. F. Gutierrez
Attorney, Agent, or Firm—Majestic, Parsons, Siebert & Hsue

[57] ABSTRACT

High temperature range black body techniques are combined with lower temperature range photoluminescent techniques to provide an optical method and apparatus for measuring temperature over a very wide range. Among the various optical probe configurations disclosed which combine the black body and photoluminescent technologies is an optical temperature measuring probe including an elongated transparent light pipe with a black body cavity and a photoluminescent material adjacent one end of the light pipe. Signal detection and processing can be combined, and temperature measurements made by the photoluminescent technique within an overlap of the two temperature ranges can be used to calibrate measurements made in the higher range by the black body technique.

6 Claims, 6 Drawing Sheets

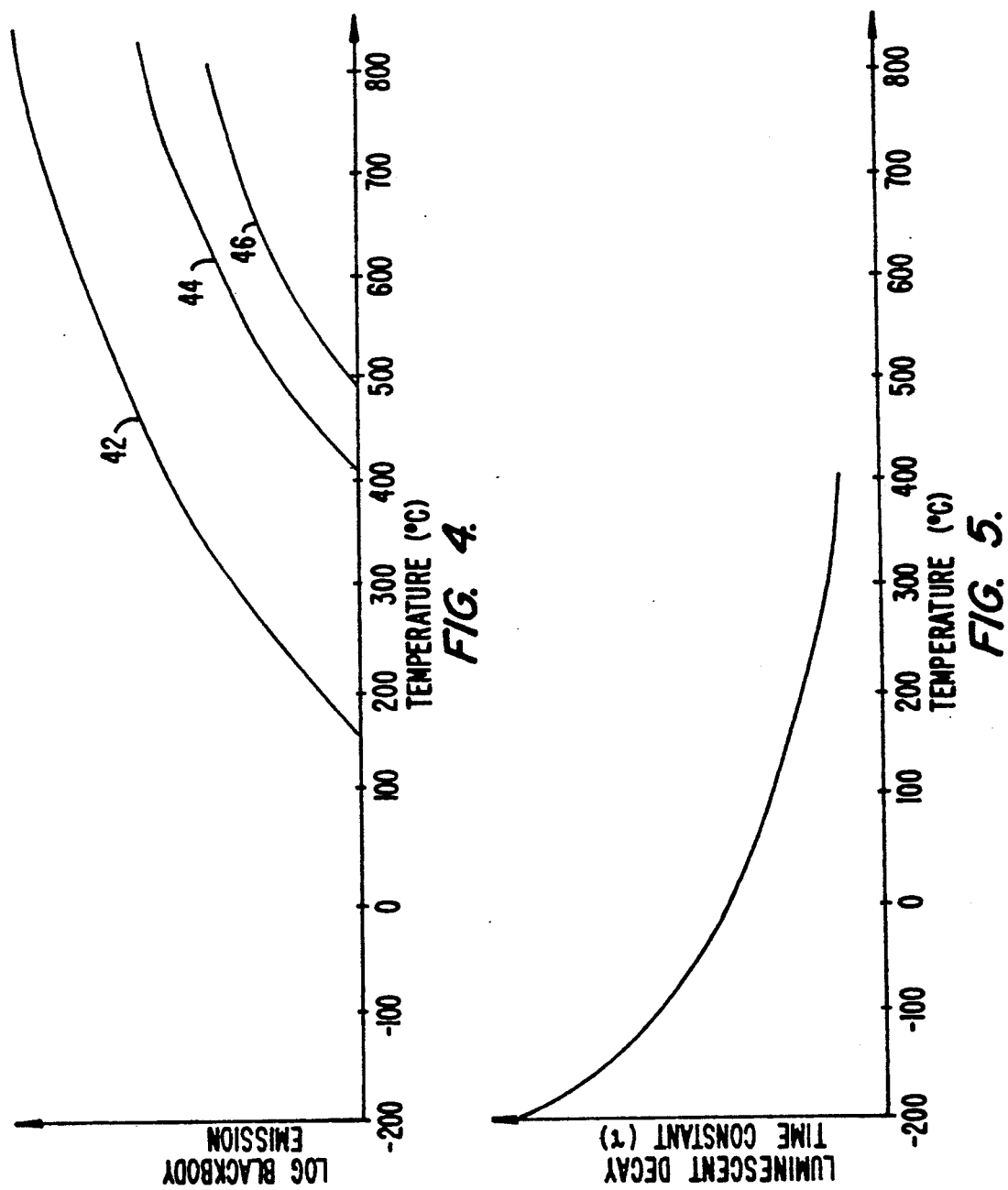

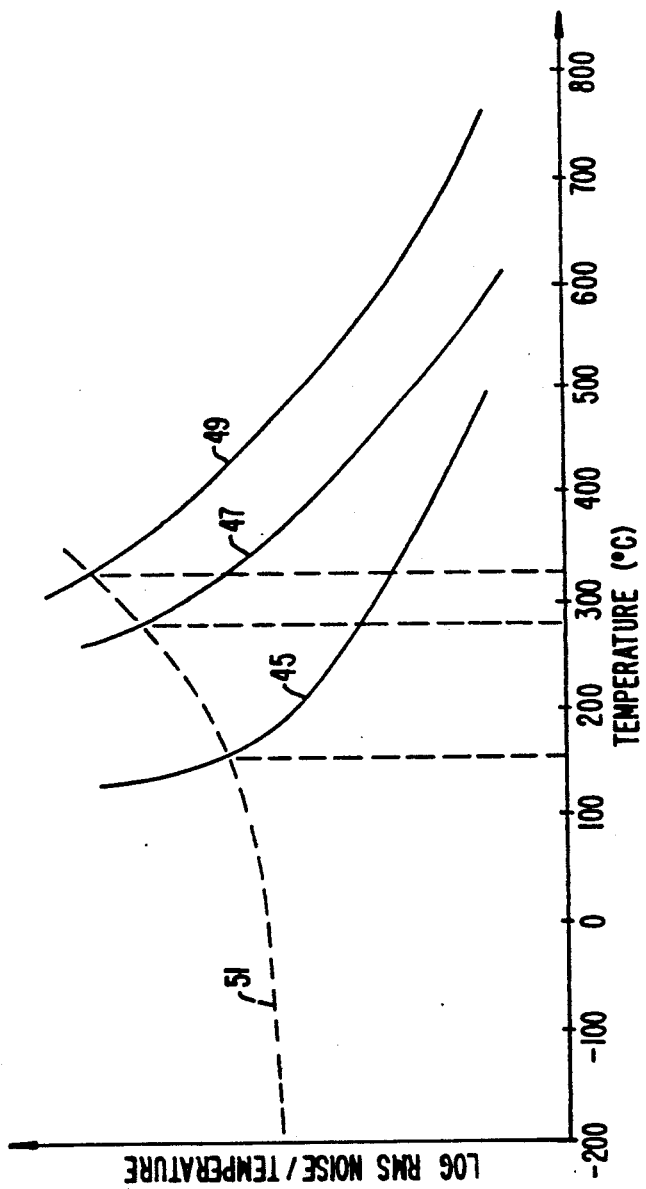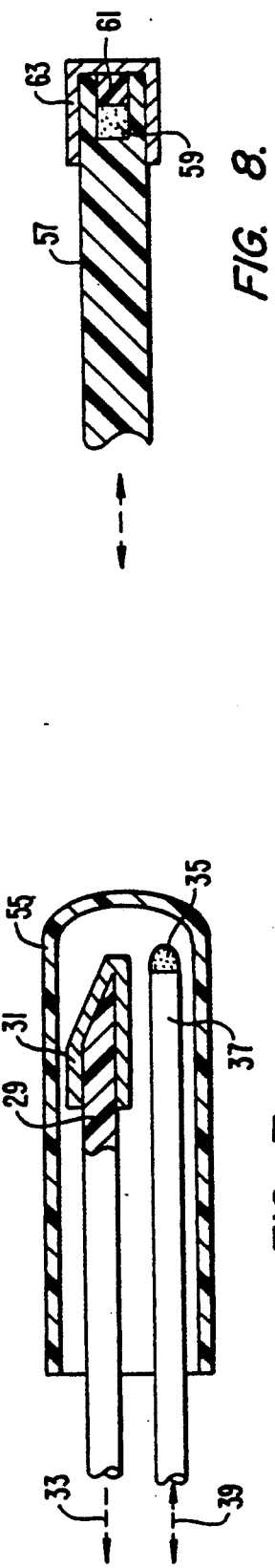

TEMPERATURE MEASUREMENT WITH COMBINED PHOTO-LUMINESCENT AND BLACK BODY SENSING TECHNIQUES

This is a division of application Ser. NO. 07/683,258, filed Apr. 10, 1991, now U.S. Pat. No. 5,112,137.

BACKGROUND OF THE INVENTION

This invention relates generally to techniques of optically measuring temperature.

Optical techniques for measuring the temperature of surfaces or other solid objects, and fluids or other environments, are becoming increasingly utilized in place of more traditional electrical techniques, such as those utilizing thermocouples, thermistors or resistance thermometry devices (RTDs). An early optical technique for measuring the temperature of surfaces was infrared radiometry. With this technique, the infrared energy being emitted from the surface of interest was measured by a non-contact technique. If the emissivity of the surface is known, its temperature can be calculated from the infrared emission intensity measurement. Since it is often difficult to know with precision the emissivity of the surface of interest, such measurements are not always made with the accuracy that is desired. Further, infrared radiometry is a technique which is made useful for measuring high temperatures but is not as useful for applications requiring measurement of low temperatures.

Various other optical techniques have been suggested for measuring lower temperatures. One such technique utilizes a liquid crystal film enclosed in a housing at a tip of an optical fiber probe designed for implantation in biological tissue to measure its temperature. The proportion of light directed against the sensor which is reflected by it is an indication of temperature. An example of this technique is given in U.S. Pat. No. 4,016,761 Rozzell et al. (1977). Another technique, described in U.S. Pat. No. 4,140,393 Cetas (1979) utilizes a birefringement crystal as the temperature sensing element at the end of an optical fiber. U.S. Pat. No. 4,136,566—Christensen (1979) relies upon a shifting light absorption edge of a semiconductor material as a function of temperature.

Many other types of optical temperature sensors have been proposed but the use of a photoluminescent sensor has found the widest commercial acceptance for lower temperatures. Early photoluminescent devices continuously excited the sensor to luminescence and measured the relative intensities of the resulting emission in defined wavelength bands. Implementations of this technique are described in U.S. Pat. Nos. 4,448,547 - Wickersheim (1984) and 4,376,890 —Engström et al. (1983).

More recently, the temperature dependent decay time of photoluminescence is utilized in temperature measuring instruments. The sensor is excited to luminesce by directing against it a time varying excitation radiation signal and a time varying characteristic of the resulting luminescence is detected and processed to extract temperature information from it. Examples of this are given in U.S. Pat. Nos. Re. 31,832 —Samulski (1985) and 4,652,143 —Wickersheim et al. (1987), and U.K. Patent No. 2,113,837B - Bosselmann (1986). The commercial forms of such products form a sensor of the photoluminescent material at the end of a single optical fiber. Because the technique measures temperature dependent decay time changes in luminescent intensity, rather than absolute levels, the systems require little or no calibration in order to provide measurements of acceptable accuracy.

The photoluminescent techniques are particularly useful for measuring from low temperatures (such as $-100°$ or $-200°$ C.) to moderately high temperatures (300 to 500° C.). However, since the technology depends on the phenomenon of thermal quenching of luminescence, the sensor materials cease emitting light at very high temperatures. There are a very small number of photoluminescent materials which can be used up to 1000° C. or so but these materials have a very limited range of use and cannot be used at much lower temperatures.

As a separate body of technology, fiber optic probe temperature sensors have also been developed utilizing black body structures as sensors. Examples of this technology are given in U.S. Pat. Nos. 4,576,486 —Dils (1986), 4,750,139 —Dils (1988), and 4,845,647 Dils et al. (1989). Designed primarily for measuring extremely high temperatures, an optically transmitting probe that can withstand those temperatures is coated at one end with an appropriate opaque material to form a black body cavity. Temperature dependent infrared emission from the black body cavity is carried along the optical transmission medium to a connecting optical fiber and then to a measuring instrument. Alternatively, an external object or surface can be made into the shape of a black body cavity and a light pipe used to gather, with or without use of a lens system, its emissions for transmission to a detector without contacting the black body.

While such an infrared system, when used with appropriate near infrared detectors and transmitting materials, can also cover a wide temperature range, it does not work well at lower temperatures (e.g. below about 200° C. to 300° C.) and thus cannot be used down to most ambient temperatures. In order to remedy this low temperature limitation to some extent, an electrical technology, such as one using thermocouples, is sometimes used in combination with the black body sensor, an awkward combination of optical and non-optical temperature measurement technologies.

Furthermore, while the black body emission follows very well defined laws of physics in terms of its dependence on temperature, the emission is modified by other factors, such as losses in connectors and the transmitting materials. Since the system depends on an intensity measurement, calibration of the complete system is required. This is not always convenient or possible, especially in industrial process control or aerospace applications, where the optical transmission cables are built into the system in advance and the sensors may be quite remote and typically inaccessible.

It is a principal object of the present invention to provide an optical system for accurately measuring temperatures over a very broad temperature range. It is another object of the present invention to provide such a system which is essentially self-calibrating.

SUMMARY OF THE INVENTION

This and additional objects are accomplished by the present invention, wherein, briefly and generally, the photoluminescent and black body technologies are combined to form single sensors and accompanying measuring instruments which together provide the capability for covering a wide, continuous temperature measurement range. The sensor can either be part of a probe at the end of an optical transmission medium or in a form to be attached to an object or placed in an environment with its temperature being remotely measured without contact with a light pipe or other optical elements. Depending upon a choice of materials for the sensor, a system utilizing the present invention will accurately measure over a temperature of from −200° C. to 1000° C. or more. A specific application of such a technology and system is in aircraft or aerospace vehicles where temperatures range from the extremely cold ambient temperatures of outer space to the very high temperatures generated within a jet engine or at the nose of a reentry vehicle upon reentering the earth's atmosphere.

The present invention combines the advantages of two dissimilar optical techniques to produce a single system which is essentially self-calibrating and can measure temperature over an even wider range, such as from cryogenic temperatures to temperatures at which the sensors become highly incandescent. The sole requirement is that the sensor and probe materials can survive the desired upper temperature range without physical damage or change of the optical characteristics upon which the measurements are based. Fortunately, such materials exist and can be made use of in such a hybrid system.

Additional objects, advantages and features of the various aspects of the present invention will become apparent from the following description of its preferred embodiments, which description should be taken in conjunction with the accompanying drawings.

BRIEF DESCRIPTION OF THE DRAWINGS

FIGS. 2 and 4 show exemplary black body sensor characteristics;

FIGS. 3 and 5 show exemplary photoluminescent sensor characteristics;

FIG. 6 shows the cooperative effect of the photoluminescent and black body measurements in order to provide temperature readings over an expanded, continuous range of temperatures;

FIGS. 7-13 illustrate, in partial cross-sectional views, various different specific examples of temperature sensing probes combining luminescent material and a black body structure;

DESCRIPTION OF THE PREFERRED EMBODIMENTS

Figure 1:
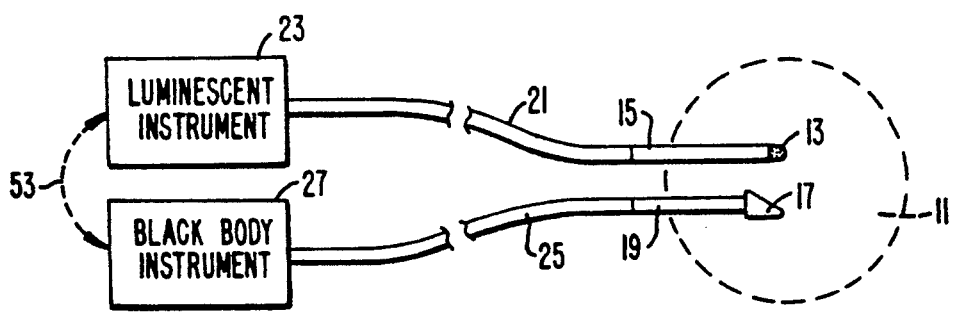
FIG. 1 conceptually illustrates the combination of photoluminescent and black body temperature measuring techniques.

Referring initially to FIG. 1, the technique of combining photoluminescent and black body temperature measuring techniques is generally illustrated. Placed in an environment 11 whose temperature is to be measured, are two temperature measuring probes, one including a photoluminescent sensor 13 attached to an end of an optically transmitting fiber or light pipe 15, and the other having a black body sensor 17 carried by the end of an optically transparent fiber or light pipe 19. The materials of these probes must, of course, be able to withstand the effects of a full temperature range to be measured. The light pipes 15 and 19 are generally selected to be sapphire since they can withstand very high temperatures, but alternate materials can be used as well. The photoluminescent probe is optically connected by an optical fiber 21 to a measuring instrument 23, and the black body probe is connected by an optical fiber 25 to its measuring instrument 27. Each of the photoluminescent and black body temperature measuring systems are commercially sold separately by Luxtron Corporation, assignee of the present application. What is new is the cooperative use of the two temperature measuring technologies embodied in these systems.

Before describing details of the preferred embodiments of sensors and measuring techniques that combine the principles of operation of these two instruments, the characteristics of each of the black body and luminescent measuring techniques will be separately described. For the black body technique, the structure of a black body cavity at the end of an optical light pipe by depositing a film thereon is described in aforementioned U.S. Pat. No. 4,576,486, which is incorporated herein by this reference. The light pipe's end is generally tapered, as shown for a light pipe 29 in the embodiment of FIG. 7. Coated around that end, preferably by a sputtering technique, is an appropriate black body cavity forming layer 31, such as platinum-rhodium. The layer is made to be thin in order to provide a fast temperature response. The cavity emits, in a direction along the length of the light pipe 29, electromagnetic radiation at the infrared end of the optical radiation spectrum. The result is an infrared optical signal 33 which is passed back to a measuring instrument that converts the intensity of the emitted radiation to temperature.

Figure 2:
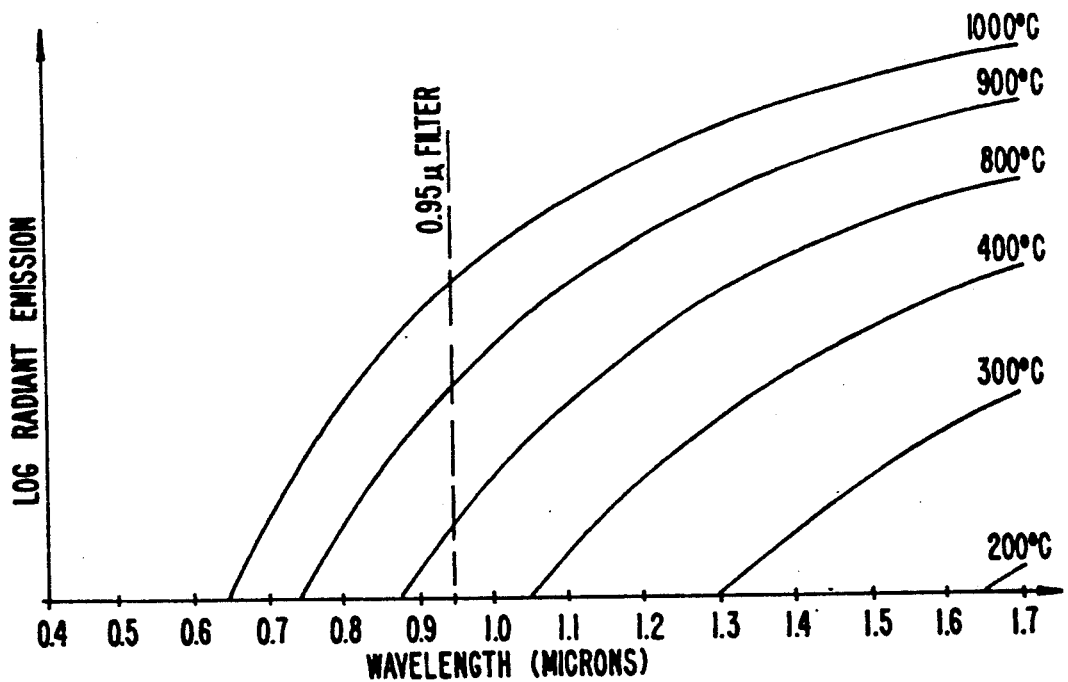

The emission of such a sensor is illustrated with the family of curves of FIG. 2. The spectrum of emission, generally in the infrared range, and its intensity increase with increasing temperature. The signal received at a detector is a bandwidth limited version of what is shown in FIG. 2 since the sapphire light pipe and optical fiber link have some limiting effect. Additionally, in one form, a silicon photodiode is used as a detector and a narrow bandwidth optical filter around 0.95 micron wavelength is used in conjunction with it. An electrical signal output of this photodetector is then related to the temperature of the black body sensor.

Example black body emission characteristics as a function of temperature, as observed by specific optical and detector combinations, are given in the curves of FIG. 4. Curve 42 shows a typical response of an indium-gallium-arsenide detector over about 0.8 to 1.7 microns. Curve 44 illustrates a typical response of a silicon photodiode without any filtering other than that provided by the optical transmission medium itself. Curve 46 shows a response of a silicon photodiode with use of a filter having a narrow bandwidth with a center wavelength of 0.95 microns.

In the photoluminescent sensor structure, such as that shown in FIG. 7 in one form, a powdered luminescent material forms a sensor 35 that is physically attached to an end of a sapphire light pipe 37 which carries optical signals indicated at 39, an excitation signal directed toward the sensor 35 and the temperature dependent luminescent signal traveling away from it to a photodetector in measuring instrumentation. A preferred photoluminescent material and temperature measuring system is described in copending application Ser. No. 621,900, filed Dec. 4, 1990 of Jensen et al., of common ownership with the present application, which is incorporated herein by this reference. The preferred luminescent material described in that application is a chromium activated yttrium-gallium garnet ("YGG"). It has an advantage in the present application in that it survives the temperatures at the upper end of the extended temperature range contemplated.

Figure 3:
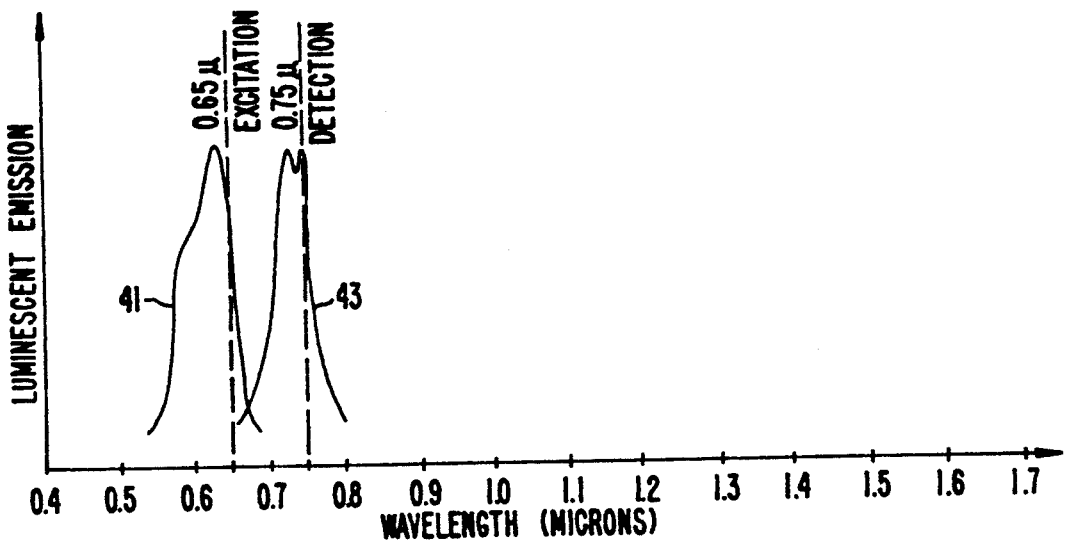

Referring to FIG. 3, a curve 41 indicates an absorption spectrum of this particular photoluminescent material, while a curve 43 provides its resulting luminescent emission spectra. The material is excited from a light emitting diode at about 0.65 micron wavelengths, within its absorption spectrum. Its luminescence is detected by a silicon photodiode after its bandwidth is narrowed around 0.75 micron by an appropriate filter. FIG. 5 shows a curve of the measured luminescent decay time as a function of temperature of the luminescent material.

In the combined system of FIG. 1, and in the modifications of it to be described below, the continuous extended temperature range capability is provided by utilizing the photoluminescent sensor when the temperature being measured is in a lower portion of this range and by the black body sensor when in a higher portion. Since there is some overlap in the subranges of temperature that is measurable by each of these techniques, some decision must be made when to rely on one or the other of the temperature signals or measurements.

The curves of FIG. 6 illustrate the preferred crossover temperatures. The lower limit of the black body measurement is determined primarily by the choice of photodetector and bandwidth limitations of the optical signal transmission media. Three curves 45, 47 and 49 show, for different black body detector arrangements but similar types of optical fiber transmission paths, an estimate of the noise level of the resultant detected electrical signal as a function of temperature. Similarly, the dashed curve 51 shows an estimate of such a noise function for the preferred photoluminescent system described above. The lowest noise measurements will be obtainable throughout the upper and lower temperature ranges of the combined technology when the transition temperature between them is the temperature at which their respective FIG. 6 curves intersect.

For example, the curve 45 represents the use of a silicon photodiode to detect black body radiation of an optical fiber probe of the type described above, without any filters being utilized. The curve 47 crosses the curve 51 at about 280° C. The curve 49 represents a case where a similar silicon photodiode is utilized, but with the black body emission wavelengths being limited to a range around 0.95 micron by a narrow bandwidth optical filter. If that combination is utilized, the crossover temperature is about 325° C. Similarly, curve 45 shows the use of an indium-gallium-arsenide black body radiation photodetector, without any filters, and the crossover point with the photoluminescent system under those conditions is about 160° C. However, a given combination of photoluminescent and black body temperature sensing will have a single cross-over temperature that can be observed automatically by controlling electronic processing of both signals or can simply be noted by a user of a dual system of FIG. 1. The temperature reading from the photoluminescent instrument 23 is relied upon when the temperature is below the given crossover temperature of the system, and that of the black body instrument 27 is relied upon if above that temperature.

FIG. 6 also illustrates that there is a significant range of overlap where temperature can be measured to a good degree of accuracy by either system. The dotted line 53 of FIG. 1 indicates coupling that may occur between the instruments 23 and 27, either electronically or manually by an operator of separate instruments, in order to use the photoluminescent reading within this range of overlap to calibrate the black body instrument reading. As mentioned above, a photoluminescent temperature measuring system based upon the temperature dependent decay time of the luminescence requires little or no calibration. Factors that will affect the absolute signal level that is detected, such as the effect of aging of light sources and detectors, varying optical coupling of connectors, changing fiber transmission, and the like, do not affect the photoluminescent decay time measurement. But these factors do affect the absolute intensity of the detected black body emission, so periodic calibration of a black body instrument is required.

Such calibration is most easily accomplished in the system of FIG. 1 by placing both the photoluminescent sensor 13 and black body sensor 17 at a common temperature within a band around the appropriate crossover temperature indicated in FIG. 6. The reliable temperature measured by the photoluminescent instrument 23 is then used to adjust the measurement of the black body instrument 27. Once adjusted, the black body instrument 27 will then be accurate over its full sub-range of temperatures, including those that are too high for the photoluminescent sensor to operate satisfactorily. Similarly, the black body measurement can be used to calibrate the photoluminescent measurement in this same temperature range, should this become necessary. An example is when the photoluminescent material changes its response characteristics somewhat as a result of being exposed to too high a temperature and the black body portion of the system remains accurate from a recent calibration.

The combination of separate photoluminescent and black body sensors indicated in FIG. 7 is preferably surrounded by a high temperature withstanding sheath 55, such as one made from sapphire. The interior of the sheath can contain air or some other material that has a refractive index less than that of the materials (typically sapphire) forming the optical fibers or light pipes 29 and 37. The individual light signals 33 and 39 are separately detected and processed.

In order to further integrate the photoluminescent and black body techniques, several examples are shown in FIGS. 8-13 of a single light pipe or light pipe, again made of sapphire in these examples, into which both of the black body and photoluminescent sensors are built. In FIG. 8, a light pipe 57, of circular cross-section, has a circular hole drilled in an end. Into the bottom of this hole is placed a quantity of photoluminescent material 59 which is held in the hole by a plug 61. The use of luminescent material in a powdered form is usually preferred because such a sensor is homogeneous and reproducible but a luminescent crystalline material can alternatively be utilized. A black body cavity, in which the luminescent material 59 resides, is formed by a coating 63 of a type generally used for such purposes. Optical communication between the two sensors and a measuring instrument occurs along the single optical light pipe 57.

Figure 9:
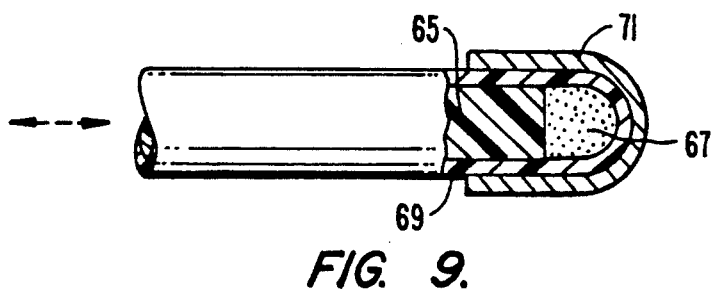

A modified probe shown in FIG. 9 includes a central optical light pipe 65 having a quantity of luminescent material 67 held at an end thereof by a surrounding sheath 69. On the outside of the sheath 69, at its enclosed end and surrounding the photoluminescent material 67, is an opaque coating 71 forming the black body cavity. The refractive index of the sheath 69 is made to be less than that of the light pipe 65, thereby forming a cladding, if the light pipe 65 is to function properly in carrying optical signals along its length without a high level of loss. However, it is desired to provide a coupling of optical signals out of the sheath 71 and into the light pipe 65 adjacent its end since a significant level of both the black body and photoluminescent radiation signals can exist in the sheath 69. This is accomplished by roughening mating surfaces thereof in a region adjacent the end of the light pipe 65.

Figure 10:
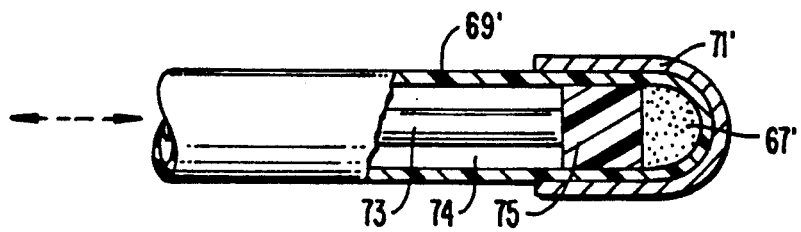

Since it is difficult to provide a desired difference in the refractive indices of the adjoining light pipe 65 and sheath 69 from available materials that have necessary high temperature capabilities, an alternative structure, shown in FIG. 10, utilizes a smaller diameter light pipe 73 within a similar sheath 69' such that an air space 72 surrounds the light pipe 73. The air space 72 acts as a cladding since its refractive index is much less than that of sapphire. But in order to trap a quantity of photoluminescent material 67' within the sheath 69', a cylindrically shaped, optically clear plug 75 is tightly fit within the sheath 69' at the end of the light pipe 73. It is also desirable in this embodiment, as explained with respect to the FIG. 9 embodiment, to provide roughened surfaces where the plug 75 contacts an inside surface of the sheath 69'. Such roughening provides improved optical communication between the black body cavity formed by the layer 71' and the photoluminescent material, on the one hand, and the optical light pipe 73, on the other hand, through the sheath 69' and the plug 75.

Figure 11:
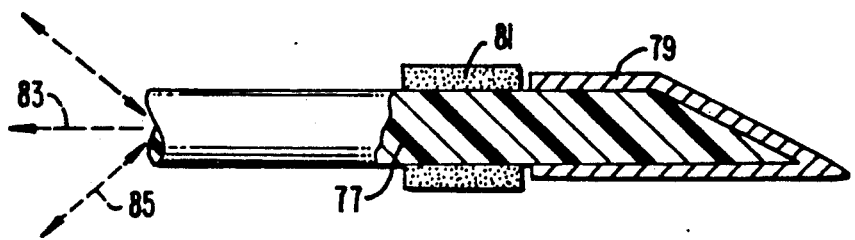

Referring to FIG. 11, the ability to selectively communicate an optical signal through an end and side of an optical light pipe is utilized to advantage. A light pipe or rod 77 has a black body cavity forming layer 79 applied to its tip. Adjacent this coating, but outside the black body cavity itself, is a band 81 that surrounds the light pipe 77. The band 81 includes photoluminescent material. The outside of the light pipe 77 in contact with the photoluminescent sensor 81 is roughened in order to allow light rays to travel it and an interior of the light pipe 77. One advantage of the structure of FIG. 11 is that the two optical signals travel in different modes along the light pipe 77, a black body intensity signal 83 traveling principally via low order (central) modes and the photoluminescent signal traveling via higher order modes 85.

Figure 12:
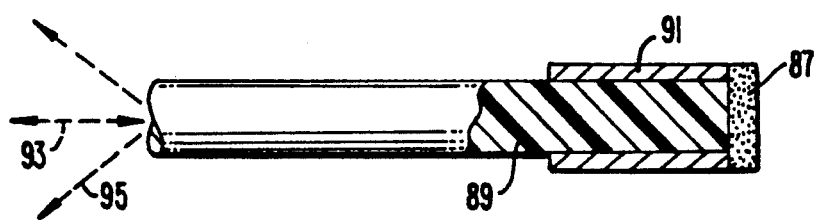

The sensor of FIG. 12 is similar to that of FIG. 11, except that a photoluminescent material sensor 87 is attached directly to an end of a light pipe 89, effectively completing the black body cavity, the remainder of which is formed by a coating 91 in the form of a cylinder surrounding the light pipe 89 at a position adjacent its end. As before, the surface of the light pipe 89 is roughened where the black body coating 91 exists. In this case, the lower order (central) modes 93 contain most of the signal from the luminescent sensor 87 while higher modes 95 contain most of the signal from the black body cavity.

Figure 13:
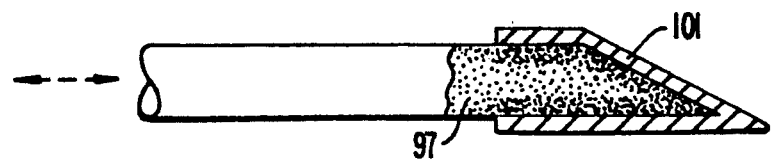
Figure 14:
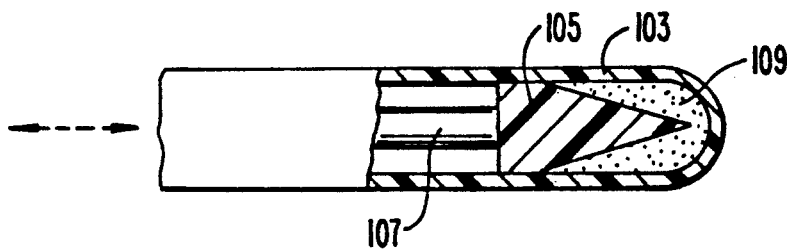
FIGS. 14 and 15 show, in partially cross-sectional views, examples of temperature sensing probes utilizing the photoluminescent material itself to form a black body cavity.
Figure 15:
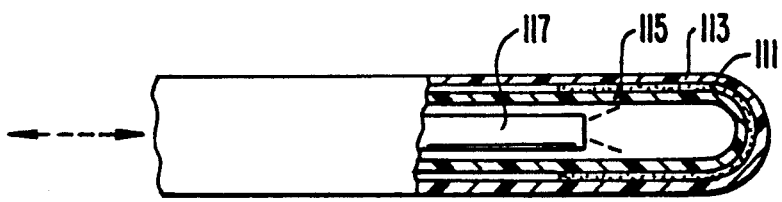

The sensor embodiment of FIG. 13 takes advantage of the fact that a satisfactory photoluminescent material can be made from sapphire. Ruby, previously suggested for use as a photoluminescent temperature sensor, is formed by doping sapphire with chromium. The usual sapphire optical light pipe 97, in the embodiment of FIG. 13, has chromium diffused into it within a black body cavity. As indicated in FIG. 13 by the varying density of dots at the end of the light pipe 97, the concentration of dopant is the highest at the light pipe's end, and then decreases zero a distance from its end. A black body cavity forming layer 101 of the usual type is then positioned over the end of the light pipe 97. Alternatively, the dopant can form a sufficient black body cavity by itself In the embodiments of FIGS. 8–13 just described, the temperature sensing probe utilizes separate elements to form the photoluminescent and black body sensors. In the embodiments of FIGS. 14 and 15, on the other hand, the luminescent material itself is shaped to form the walls of a black body cavity. In FIG. 14, an outer sheath 103 that is closed at one end contains an optically transparent cone-shaped insert 105 that is optically coupled to a light pipe 107. Packed in the space between the cone 105 and an inside surface of the sheath 103 is a quantity 109 of photoluminescent material. No separate coating is necessary to form a black body cavity since that is formed by the cone-shaped element 105.

A similar result is obtained by the embodiment of FIG. 15, but with a different structure. A cylindrically shaped layer 111 of photoluminescent material is trapped between an outer sheath 113 and an inner sheath 115. A black body cavity is thus formed within the inner sheath 115 at its end. An optical light pipe 117 is positioned to communicate with the black body cavity and thus also with the photoluminescent material which forms its walls.

In the sensor embodiments described above, both of the photoluminescent and black body sensors are physically attached to a light pipe that forms part of the optical path back to the measuring instrument. There are applications where it is desirable to remotely make such temperature readings by optically communicating with a sensor that is spaced some distance away from the light pipe or other instrument optics. Examples of such remote temperature measurements are given in FIGS. 16 and 17.

Figure 16:
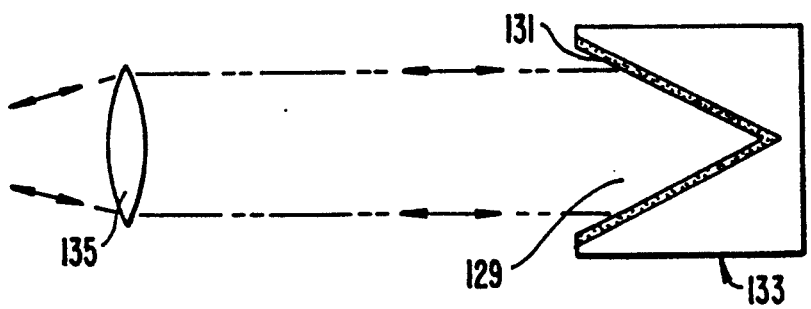
FIGS. 16 and 17 illustrate different specific arrangements for remotely measuring temperature.

Referring to FIG. 16, a black body cavity 129 has interior walls formed of a photoluminescent material layer 131, as part of a sensor 133. The sensor 133 is positioned in an environment or in contact with an object whose temperature is to be measured. An appropriate optical system 135 communicates optical signals between the cavity 129 and appropriate photodetectors (not shown). The optics 135 also communicate excitation radiation for the photoluminescent material 131. Thus, a single cavity is formed of luminescent material, in a manner similar to that of the probes of FIGS. 14 and 15, except that this sensor 133 is adapted for remote temperature measuring applications. In the event that a particular structure does not provide perfect black body radiation characteristics, high range temperature measurements are adjusted since the emissivity of layer 131 can be determined.

Figure 17:
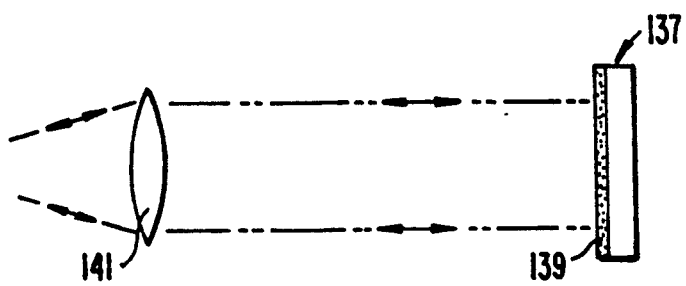

Similarly, with reference to FIG. 17, a flat sensor 137 contains a generally flat layer 139 of photoluminescent material. An appropriate optical system 141 allows optical signals to be communicated between the surface 139 and the appropriate luminescent excitation source and one or more photodetectors (not shown). The high temperature subrange of the extended temperature range being measured is accomplished by detecting the infrared emissions of the luminescent senor 139 whose emissivity is known and can even be controlled. Knowledge of the emissivity allows its temperature, when in the higher end of the extended range, to be calculated from its infrared emissions. By use of a controlled sensor 137, rather than sensing the infrared emissions from the surface of an object to be measured, the emissivity can be known with some certainty and the temperature thus measured with some accuracy. This approach further supplements the cross-calibration which is possible in the overlap of the two portions of the temperature range than can be measured by the sensor 127.

FIGS. 18-21 illustrate generally three different ways of processing the optical signals from the combined photoluminscent and black body sensors described previously. Referring first to FIG. 1, an optical fiber 143 can communicate, for this detecting embodiment, with any of the sensors of FIG. 8-10, and 13-17. A light source 145 emits an excitation beam 147 through a beam splitter 149 and into the optical fiber 143. The light source 145 can be a light emitting diode, flashlamp, laser, or other type, depending upon the characteristics of the photoluminescent material to be excited A single optical signal 151 traveling through the fiber 143 from one of those sensors is divided into different frequency bands by utilizing a dichroic type of beam splitter 149. Reflecting onto a detector 153 is a portion 155 of the light signal 151 that is longer in wavelength than about 0.95 microns. This is the wavelength range in which the emissions of the black body sensor lie. Another component 157 of the signal 151 is directed onto another photodetector 159, this including the wavelengths below 0.95 microns, which include the luminescent wavelength band example described above. An instrument 161 generates a time varying signal that periodically excites the luminescent material, and also contains processing circuits for the signal from the photodetector 159. Similarly, processing circuit 163 receives the black body signal output of the detector 153 and processes that to obtain temperature information. The instruments 161 and 163 are cooperatively operated through a link 162, which can be accomplished by hand control of two separate instruments for calibration and the like or integration of the two through electronic circuits.

Figure 18:
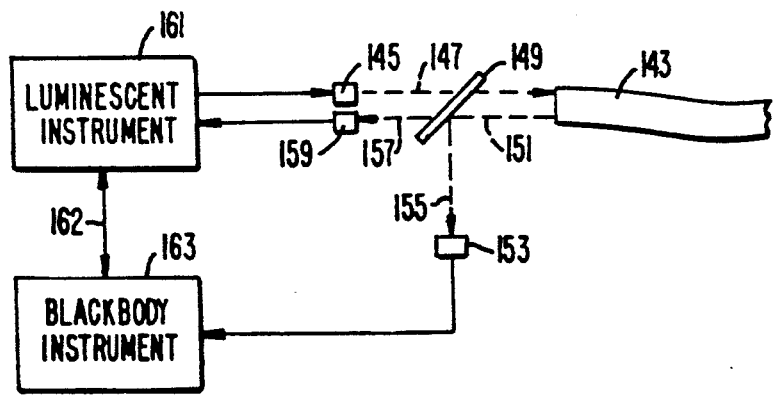
FIG. 18 generally illustrates one form of optical detection and signal processing.
Figure 19:
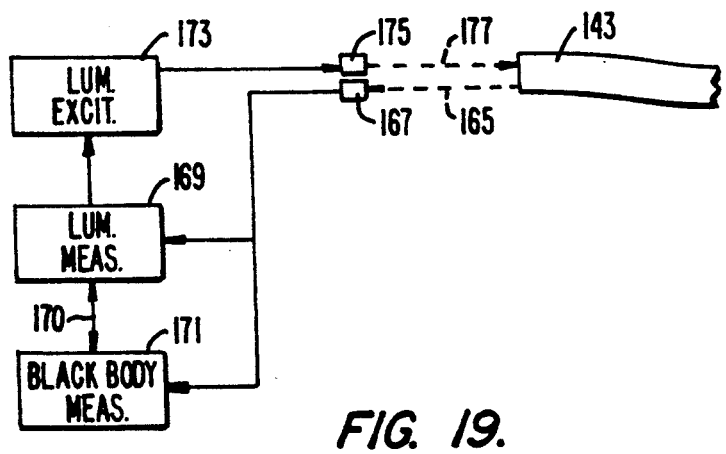
FIG. 19 shows another example of optical detection and signal processing.

The system of FIG. 19 similarly operates with the same sensors as does the system of FIG. 18, but is somewhat simplified in that a temperature containing optical signal 165 is not divided into its frequency components but rather is directed onto a single photodetector 167. The output of the photodetector 167 is supplied to both a circuit 169 for determining temperature from the luminescent component and a circuit 171 for determining temperature from the black body component. For a given sensor temperature, the black body infrared signal is constant while the luminescent signal is time varying, so can be individually detected Generally, except at a calibration temperature, one or the other measuring systems is used but not both. Thus, the circuits 169 look at the varying part of the optical signal and the circuits 171 look at a direct current component. Another circuit 173 provides a time varying signal to drive a light source 175 to provide photoluminescent excitation radiation 177. Interconnecting circuits 170 allow for automatic calibration of the black body measurement subsystem 171 from readings taken by the luminescent measurement subsystem 169 in an overlap of the two ranges.

Figure 20:
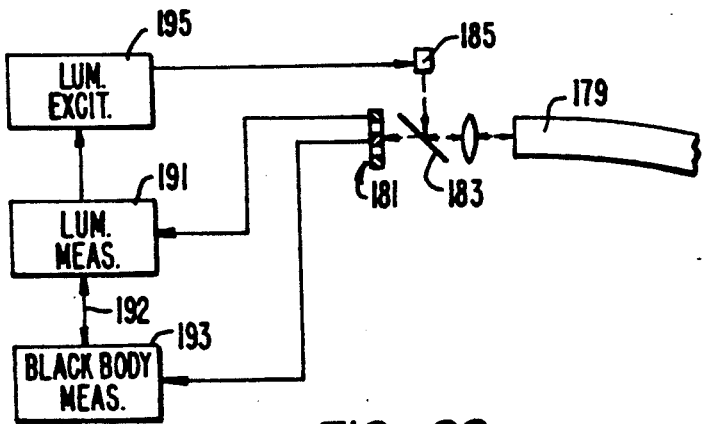
FIG. 20 shows a further example of optical detection and signal processing; and, FIG. 21 shows a front view of a dual detector utilized in the embodiment of FIG. 20.
Figure 21:
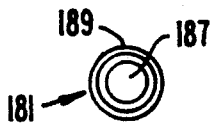

The processing generally illustrated by FIGS. 20 and 21 is specially adapted for use with the sensors of FIGS. 11 and 12. An optical signal from the sensor through an optical fiber 179 is imaged by appropriate optics onto a detector structure 181 without separating wavelength bands. A beam splitter 183 is utilized for directing into the fiber 179 luminescent excitation radiation from a light source 185. The detector structure 181 includes a central photodetector 187 and an outer array of photodetector 189 arranged in a circle around it and having dimensions that match the peaks of the spatially separated modes outputted from the light pipes 77 and 89 in the respective embodiments of FIGS. 11 and 12. Alternatively, the photodetector structure can be formed by a large diameter circular detector having the smaller circular detector 187 positioned in front of it in a manner to function as a mask and leave an outer ring of the larger detector exposed to function as the ring 189 in the FIG. 21 embodiment. Optical elements can be added in cooperation with each detector to conform to the individual system in which the detector assembly is a part.

A signal from the outer detector ring 189 is applied to a luminescent signal processing circuit 191 and the central photodetector output is applied to a black body signal processing circuit 193. Interconnecting circuits 192 allow for cooperative operation including calibration. It will be recognized that this arrangement matches that of the FIG. 12 embodiment sensor. For the FIG. 11 embodiment, the connection of the two photodetectors with the processing circuits 191 and 193 is simply reversed. In either case, a circuit 195 exists for driving the light source 185 with a time varying signal.

Although the various aspects of the present invention have been described with respect to its preferred embodiments and specific examples thereof, it will be understood that the invention is entitled to protection within the full scope of the appended claims.

It is claimed:

1. An optical temperature measuring sensor, comprising:
    an elongated substantially optically transparent light pipe,
    a black body cavity held adjacent one end of the light pipe and adapted to send temperature dependent optical emissions thereof along said light pipe, and
    a quantity of photoluminescent material held adjacent said one light pipe end and adapted to send, when excitation radiation is directed thereagainst along said light pipe, temperature dependent optical emissions thereof along said light pipe.

2. The sensor of claim 11 wherein said light pipe is made of sapphire and said photoluminescent material is formed by a diffusion of chromium activator therein.

3. The sensor of claim 11 wherein the black body cavity is optically coupled with said light pipe through said one end thereof and the photoluminescent material is optically coupled with said light pipe through a side surface thereof adjacent said one end.

4. The sensor of claim 11 wherein the photoluminescent material is optically coupled with said light pipe through said one end thereof and the black body cavity is optically coupled with said light pipe through a side surface thereof adjacent said one end.

5. The sensor of claim 11 wherein said black body cavity is formed by a coating of opaque material carried by said one light pipe end and extending a distance therefrom along the light pipe, and wherein said quantity of photoluminescent material is positioned within said cavity.

6. The sensor of claim 1 wherein said black body cavity includes walls formed of said quantity of photoluminescent material.

* * * * *

UNITED STATES PATENT AND TRADEMARK OFFICE
CERTIFICATE OF CORRECTION

PATENT NO. : 5,183,338

DATED : February 2, 1993

INVENTOR(S) : Wickersheim et al.

It is certified that error appears in the above-identified patent and that said Letters Patent is hereby corrected as shown below:

Column 10, line 56, in Claim 2:   Replace "11" with --1--

Column 10, line 59, in Claim 3:   Replace "11" with --1--

Column 10, line 64, in Claim 4:   Replace "11" with --1--

Column 11, line 1, in Claim 5:   Replace "11" with --1--

Signed and Sealed this

Thirtieth Day of November, 1993

Attest:

BRUCE LEHMAN

*Attesting Officer*          *Commissioner of Patents and Trademarks*